(12) United States Patent
Chow et al.

(10) Patent No.: US 11,400,694 B2
(45) Date of Patent: Aug. 2, 2022

(54) MULTILAYER ARTICLE SUITABLE FOR USE OF STORAGE BAG FOR AGRICULTURAL PRODUCTS

(71) Applicant: KURARAY CO., LTD., Kurashiki (JP)

(72) Inventors: Edgard Chow, Houston, TX (US); Astrid Torres, Houston, TX (US); Wataru Hirose, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 309 days.

(21) Appl. No.: 16/554,032

(22) Filed: Aug. 28, 2019

(65) Prior Publication Data

US 2020/0070483 A1     Mar. 5, 2020

Related U.S. Application Data

(60) Provisional application No. 62/724,992, filed on Aug. 30, 2018.

(51) Int. Cl.
  *B32B 27/30* (2006.01)
  *B65D 77/00* (2006.01)
  *B32B 7/12* (2006.01)

(52) U.S. Cl.
  CPC .............. *B32B 27/306* (2013.01); *B32B 7/12* (2013.01); *B65D 77/00* (2013.01)

(58) Field of Classification Search
  CPC .......... B32B 27/306; B32B 7/12; B65D 77/00
  See application file for complete search history.

(56) References Cited

U.S. PATENT DOCUMENTS

| 5,177,138 A | * | 1/1993 | Moriyama | B32B 27/06 524/436 |
|---|---|---|---|---|
| 6,610,377 B1 | | 8/2003 | Forzano et al. | |
| 2001/0025087 A1 | * | 9/2001 | Kazeto | C08K 5/098 525/330.6 |
| 2012/0052225 A1 | * | 3/2012 | Kani | C08L 29/04 428/35.4 |
| 2015/0144523 A1 | | 5/2015 | Hirose | |
| 2015/0210788 A1 | | 7/2015 | Okamoto | |
| 2017/0087812 A1 | | 3/2017 | Hirose | |
| 2017/0129222 A1 | | 5/2017 | Baralon et al. | |
| 2017/0183493 A1 | | 6/2017 | Okamoto | |

FOREIGN PATENT DOCUMENTS

WO   WO 2015/115511 1   8/2015

OTHER PUBLICATIONS

International Search Report and Written Opinion dated Oct. 29, 2019 in PCT/US2019/048697, citing documents AA, AB and AO therein, 12 pages.

* cited by examiner

*Primary Examiner* — Michael C Miggins
(74) *Attorney, Agent, or Firm* — Oblon, McClelland, Maier & Neustadt, L.L.P.

(57) ABSTRACT

A multilayer article having at least one layer of an ethylene vinyl alcohol (EVOH) resin composition comprising of an ethylene-vinyl alcohol copolymer, an unmodified ethylene-α-olefin copolymer and acid modified ethylene-α-olefin copolymer as described below, which is suitable for use in making (or as) a storage bag for agricultural products, food, drink, pharmaceutical, cosmetic, industrial chemical, detergent products.

16 Claims, No Drawings

MULTILAYER ARTICLE SUITABLE FOR USE OF STORAGE BAG FOR AGRICULTURAL PRODUCTS

CROSS REFERENCE TO RELATED APPLICATIONS

This application claims priority under 35 U.S.C. § 119 from U.S. Provisional Application Ser. No. US62/724,992 (filed 30 Aug. 2018), the disclosure of which is incorporated by reference herein for all purposes as if fully set forth.

FIELD OF THE INVENTION

The present invention relates to a multilayer article having at least one layer of an ethylene vinyl alcohol (EVOH) resin composition comprising a blend of an ethylene-vinyl alcohol copolymer, an unmodified ethylene-α-olefin copolymer and acid-modified ethylene-α-olefin copolymer, as described below. Such multilayer articles are suitable, for example, for use as storage bags for agricultural products, food, drink, pharmaceutical, cosmetic, industrial chemical, detergent products. The multilayer articles are preferably used for storage bags for agricultural products.

BACKGROUND OF THE INVENTION

Storage bags used for agricultural products, food, drink, pharmaceutical, cosmetic, industrial chemical, detergent products desirably possess excellent oxygen barrier properties. For example, a silobag is used for storing a harvested fodder crop for lactic acid fermentation which occurs under an anaerobic conditions. The fermentation generates substances such as lactic acid and acetic acid, which suppress activity of putrefactive bacteria and proteolytic bacteria, resulting in long-term storage of fodder. Organic acids generated by the fermentation are important in nutrition for livestock.

Storage bags are also used for the purpose of blocking insect infestation, infestation development, growth of molds and resulting toxins. In the harvesting and storage of grain, insect pests or their eggs may be collected with the harvest and remain with the grain in storage. A solution is to store the grain in airtight containers. Respiration of the stored grain causes the oxygen concentration to rapidly fall to below 5% while being replaced with carbon dioxide. As a consequence, any insect pests trapped inside the container rapidly suffocate, stop feeding and eventually die.

Hermetic bags are used for preservation of agricultural commodities (for example, flavor retention) by avoiding oxidation.

Several designs of such storage bags are commercially available for these purposes. Conventionally, a polyethylene resin (which is inexpensive and excellent in mechanical strength) has been used as a thermoplastic resin film for such a storage bag; however, in order for the storage bag to have high gas barrier properties, it is common to increase the thickness of the polyethylene film. For bagged agricultural commodities, a polyethylene bag does not offer sufficient control of gas transmission through the wall of the bag as long as it is in range of practical thickness.

Alternatively, polyamide-based resins having superior gas barrier properties have been used instead of polyethylene resins (see U.S. pat. No. 6,610,377B1). When used as a storage bag (silobag), however, such polyamide-based resins are still insufficient for long-term preservation effect of silage, and particularly for inhibition of mold generation.

On the other hand, EVOH exhibits excellent gas-barrier properties (such as oxygen-barrier properties) and excellent melt processabilty. It is, therefore, processed into films and containers, and widely used as a food packaging material or the like. The oxygen barrier of EVOH is approximately 8000 times superior to that of polyethylene resin and approximately 50 times superior to that of polyamide resin. EVOH has the potential for use as a component of storage bags for agricultural products, which storage bags require higher barrier properties than offered by polyethylenes and polyamides.

In applications like silobags in which films are extruded into a large diameter tube using blown film manufacturing process, good bubble stability is also very important. Here, "bubble stability" is used as a performance index to evaluate structural fluctuation during blown film manufacturing. Because this property relates the irregularities in film thickness, bubble stability directly affects barrier properties of silobags. In addition to barrier properties, good mechanical resistance, especially tear strength during filling, storing and unloading of the grain is necessary.

Conventional EVOH, however, has high crystallization rate after melt processing, and EVOH film is rigid due to this high crystallinity. Conventional EVOH, therefore, has a disadvantage of bubble stability during extrusion and films from convention EVOH are prone to tearing during filling, storing and unloading of grain.

Various methods have been proposed in order to improve mechanical strength of conventional EVOH. For example, US2015/0144523A1 describes a resin composition comprising an ethylene-vinyl alcohol copolymer (A) and a soft resin (B), characterized in that the soft resin (B) is a thermoplastic styrenic elastomer or an α-olefinic polymer, wherein a mass ratio of the ethylene-vinyl alcohol copolymer (A) to the soft resin (B) [(A)/(B)] is within the range of 75/25 to 90/10. As described in this publication, a blow-molded container having a pinch-off part and having a layer of the resin composition as an innermost layer showed excellent impact strength as well as high resistance to impact such as dropping in actual use.

US2017/087812A1 describes a resin composition that contains an EVOH (A), an unmodified ethylene-α-olefin copolymer (B), an acid-modified ethylene-α-olefin copolymer (C), and alkali metal salt (D), wherein the a mass ratio [(B)/(C)] of the unmodified ethylene-α-olefin copolymer (B) to the acid modified ethylene-α-olefin copolymer (C) is high (at least 70/30). The use of this resin composition enables production of a multilayer structure suitable for use as an inner container for a bag-in-box (usually less than 100 μm total thickness), such structure having excellent oxygen barrier properties, and high flexibility and bending resistance.

The prior art, however, does not teach a multilayer article that exhibits both good bubble stability and tear strength which are required for agricultural storage bag applications.

SUMMARY OF THE INVENTION

In view of the above background, an object of the present invention is to provide a multilayer structure having excellent oxygen barrier properties, tear strength and bubble stability during blown film extrusion. The present invention is suitable for use of storage bag for agricultural products, food, drink, pharmaceutical, cosmetic, industrial chemical, detergent products. And, the present invention is preferably used for storage bag for agricultural products.

The present invention addresses the above-described problem by providing a multilayer article comprising at least one layer formed from an EVOH resin composition comprising:

an ethylene-vinyl alcohol copolymer (A),
an unmodified ethylene-α-olefin copolymer (B), and
an acid-modified ethylene-α-olefin copolymer(C),
wherein
a mass ratio [(A)/((B)+(C))] of the ethylene-vinyl alcohol copolymer (A) to a total amount of the umnodified ethylene-α-olefin copolymer (B) and the acid modified ethylene-α-olefin copolymer (C) is from about 95/5 to about 75/25,
a mass ratio [(B)/(C)] of the unmodified ethylene-α-olefin copolymer (B) to the acid modified ethylene-α-olefin copolymer (C) is from 65/35 to about 5/95, and
a total thickness of the multilayer article is 100 μm or greater and less than 500 μm.

In another embodiment, the degree of saponification of the ethylene-vinyl alcohol copolymer (A) is about 99 mol % or greater.

In another embodiment, the ethylene content of the ethylene-vinyl alcohol copolymer (A) is about 18 mol % or greater and about 55 mol % or less.

In another embodiment, the multilayer article of the present invention comprises:

(i) a core layer (E) obtained from the EVOH resin composition,
(ii) an outer layer (T) obtained from a polyolefin resin, and
(iii) an adhesive layer (Ad) between the core layer and the outer layer.

In another embodiment, the multilayer article comprises two outer layers, and an adhesive layer between each outer layer and a core layer.

In another embodiment, the layer structures are T/Ad/E/Ad/T and T/T/Ad/E/Ad/T/T.

In another embodiment, the total thickness of the multilayer article is from 100 μm to about 400 μm, the thickness of each outer layer (polyolefin layer) is from about 25 μm to about 200 μm, and the thickness ratio of the core (EVOH resin composition) layer in the total layer thickness is from about 1% to about 15%.

In another embodiment, the multilayer article is a multilayer film, and/or an article prepared from a multilayer film.

The multilayer articles in accordance with the present invention exhibit superior oxygen barrier and tear strength properties, and possess bubble stability during blown film extrusion.

The multilayer articles according to the embodiment of present invention are in general suitable for use a storage bags for agricultural products. For example, a bag made from a multilayer film in accordance with the present invention can pass a filling test indicating suitability for use as a silobag.

In another embodiment, therefore, the present invention relates to a method of storing a bulk amount of grain comprising the steps of filling a storage bag with said bulk amount of grain then sealing the so filled storage bag, wherein the storage bag is a multilayer article (or is constructed from a multilayer film) as described herein.

In addition, the present invention relates to a storage bag containing a bulk amount of grain, wherein the storage bag is a multilayer article (or constructed from a multilayer film) as described herein.

These and other embodiments, features and advantages of the present invention will be more readily understood by those of ordinary skill in the art from a reading of the following

DETAILED DESCRIPTION

The present invention also relates to a multilayer article having at least one layer of specific ethylene vinyl alcohol (EVOH) resin composition. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists" of appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a mass or weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

The term "bulk amount of grain" means a commercially-sized amount as would be found in normal bag bulk storage and bag bulk transportation operations, as would be recognized by one of ordinary skill in the relevant art.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Resin Composition

A resin composition used for the present invention contains EVOH (A), an unmodified ethylene-α-olefin copolymer (B) and an acid-modified ethylene-α-olefin copolymer (C) in a particular mass ratio. The resin composition can further contain other components. Further details are provided below.

EVOH (A)

The EVOH (A) of the EVOH resin composition is a copolymer having as a main structural unit an ethylene unit and a vinyl alcohol unit.

The EVOH (A) desirably has, as a lower limit of ethylene unit content (a proportion of the number of ethylene units to the total number of monomer units in the EVOH (A)), an ethylene unit content of about 18 mol % or greater, or about 20 mol % or greater, or about 22 mol % or greater. On the other hand, the EVOH (A) desirably has, as an upper limit of ethylene unit content, an ethylene unit content of about 55 mol % or less, or about 52 mol % or less, or about 50 mol % or less. The EVOH (A) having an ethylene unit content of no less than the lower limit and no greater than upper limit gives an excellent oxygen barrier and gives excellent melt processability.

The EVOH (A) typically has, as a lower limit of degree of saponification (a proportion of the number of vinyl alcohol units to the total number of the vinyl alcohol units and vinyl ester units in the EVOH (A)), a degree of saponification of about 80 mol % or greater, or about 95 mol % or greater, or about 99 mol % or greater. On the other hand, the EVOH (A) typically has, as an upper limit of degree of saponification, a degree of saponification of (substantially) 100 mol %, or about 99.99 mol % or less. The EVOH (A) having a degree of saponification of no less than the lower limit gives excellent oxygen barrier properties and thermal stability.

A method of preparing the ethylene-vinyl alcohol copolymer is not particularly limited, and may include well-known preparing methods. For example, in a general method, an ethylene-vinyl ester copolymer obtained by copolymerizing ethylene and vinyl ester monomer is saponified under the presence of a saponification catalyst, in an organic solvent including alcohol.

Examples of the vinyl ester monomer may include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Particularly, vinyl acetate is preferable.

A method of copolymerizing ethylene and vinyl ester monomer may include well-known methods such as solution polymerization, bulk polymerization, suspension polymerization, and emulsion polymerization. As a polymerization initiator, an azo-based initiator, peroxide-based initiator, redox-based initiator, and the like may be properly selected according to a polymerization method. At this time, the copolymerization may be performed under presence of thiol compounds such as thioacetic acid and mercaptopropionic acid, or other chain-transfer agents.

As a saponification reaction, alcoholysis, hydrolysis, and the like, which uses a well-known alkali catalyst or acidic catalyst as a saponification catalyst in an organic solvent, may be adopted. In particular, a saponification reaction using a caustic soda catalyst with methanol as a solvent is simple and easy, and thus, most preferable.

The EVOH (A) used in the EVOH resin composition may be a combination of two or more different types of EVOH (A). For example, the EVOH (A) can be composed of a mixture of two or more types of EVOH (A) that are different in ethylene unit content, with the combination having an ethylene content that is calculated as an average value from a mixed mass ratio. In this case, the difference between two types of EVOH (A) that have different ethylene unit contents is typically about 30 mol % or less, or about 20 mol % or less, or about 15 mol % or less.

Similarly, the EVOH (A) can be composed of a mixture of two or more types of EVOH (A) that are different in degree of saponification, with the combination having a degree of saponification that is calculated as an average value from a mixed mass ratio. In this case, the difference in degree of saponification is typically about 7% or less, or about 5% or less.

The ethylene unit content and the degree of saponification of the EVOH (A) can be determined by nuclear magnetic resonance (NMR) analysis by conventional methods as recognized by one of ordinary skill in the relevant art.

The EVOH (A) typically has, as a lower limit of a melt flow rate (a measured value at a temperature of 190° C. and a load of 2160 g in accordance with JIS K 7210), a melt flow rate of about 0.1 g/10 min or more, or about 0.5 g/10 min or more, or about 1 g/10 min or more, or about 3 g/10 min or more. On the other hand, the EVOH (A) typically has, as an upper limit of a melt flow rate, a melt flow rate of about 200 g/10 min or less, or about 50 g/10 min or less, or about 30 g/10 min or less, or about 15 g/10 min or less, or about 10 g/10 min or less. The EVOH (A) having a melt flow rate value in the above range improves melt kneadability and melt processability of a resultant resin composition.

A modified EVOH can also be used. For example, a modified EVOH can have at least one structural unit selected from, for example, structural units (I) and (II) shown below.

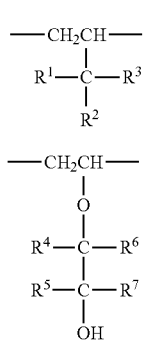

When present, such the structural unit are present at a ratio of from about 0.5 mol % to about 30 mol % based on the total structural units. Such a modified EVOH may improve flexibility and processability of a resin or a resin composition, the interlayer adhesion and stretchability.

Each of R1, R2 and R3 in the above formula (I) independently represents a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxy group. Also, one pair of R1, R2 or R3 may be combined together (excluding a pair of R1, R2 or R3 in which both of them are hydrogen atoms). Further, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, a carboxy group or a halogen atom. On the other hand, each of R4, R5, R6 and R7 in the above formula (II) independently represents the hydrogen atom, the aliphatic hydrocarbon group having 1 to 10 carbon atoms, the alicyclic hydrocarbon group having 3 to 10 carbon atoms, the aromatic hydrocarbon group having 6 to 10 carbon atoms, or the hydroxy group. R4 and R5, or R6 and R7 may be combined together (excluding when both R4 and R5 or both R6 and R7 are hydrogen atoms). Also, the aliphatic hydrocarbon group having 1 to 10 carbon atoms, the alicyclic hydrocarbon group having 3 to 10-carbon atoms, or the aromatic hydrocarbon group having 6 to 10 carbon atoms may have the hydroxy group, an alkoxy group, the carboxy group or the halogen atom.

In another example, the following modified EVOH can be used as the EVOH (A), wherein the modified EVOH copolymer is represented by a following formula (III), contents (mol %) of a, b, and c based on the total monomer units that satisfy following formulae (1) through (3), and a degree of saponification (DS) defined by a following formula (4) is not less than about 90 mol %.

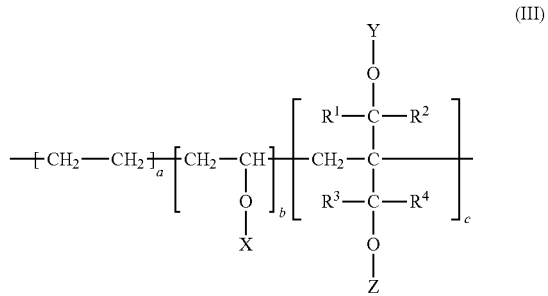

$$18 \leq a \leq 55 \quad (1)$$

$$0.01 \leq c \leq 20 \quad (2)$$

$$[100 - (a + c)] \times 0.9 \leq b \leq [100 - (a + c)] \quad (3)$$

$$DS = [(\text{Total Number of Moles of Hydrogen Atoms in X, Y, and Z})/(\text{Total Number of Moles of X, Y, Z})] \times 100 \quad (4)$$

In the formula (III), each of R1, R2, R3, and R4 independently denotes a hydrogen atom or an alkyl group having a carbon number of from 1 to 10, and the alkyl group may include a hydroxyl group, an alkoxy group, or a halogen atom. Each of X, Y, and Z independently denotes a hydrogen atom, a formyl group, or an alkanoyl group having a carbon number of from 2 to 10.

The EVOH (A) may also contain, as a copolymer unit, a small amount of another monomer unit other than the ethylene unit and the vinyl alcohol unit within a range not to inhibit the purpose of the present invention. Examples of such a monomer include α-olefins such as propylene, 1-butene, isobutene, 4-methyl-1-pentene, 1-hexene, and 1-octene; unsaturated carboxylic acids such as itaconic acid, methacrylic acid, acrylic acid, and maleic acid, salts thereof, partial or complete esters thereof, nitriles thereof, amides thereof, and anhydrides thereof; vinylsilane compounds such as vinyltrimethoxysilane, vinyltriethoxysilane, vinyltri (2-methoxyethoxy)silane, and γ-methacryloxypropylt-rimethoxysilane; unsaturated sulfonic acids or salts thereof; unsaturated thiols; and vinylpyrrolidones.

Unmodified Ethylene-α-Olefin Copolymer (B)

The unmodified ethylene-α-olefin copolymer (B) used for the present invention is not particularly limited and examples of it include, for example, an ethylene-propylene copolymer (EP), an ethylene-butene copolymer (EB), a propylene-butylene copolymer (PB), a butylene-ethylene copolymer (BE), and the like. Among them, from the perspective of excellent flexibility and improved tear strength of a multilayer article using a resin composition produced therefrom, an ethylene-propylene copolymer (EP) and an ethylene-butene copolymer (EB) are preferred and an ethylene-propylene copolymer (EP) is more preferred.

The unmodified ethylene-α-olefin copolymer (B) has a density of preferably about 0.9 g/cm$^3$ or less, or about 0.89 g/cm$^3$ or less, or about 0.88 g/cm$^3$ or less. The use of such unmodified ethylene-α-olefin copolymer (B) having a low density enables production of a multilayer article particularly excellent in tear strength. In one embodiment, the unmodified ethylene-α-olefin copolymer (B) generally has a density of about 0.85 g/cm$^3$ or more.

The umnodified ethylene-α-olefin copolymer (B) desirably has an MFR at 190° C. under a load of 2160 g of not less than about 0.1 g/10 minute, or not less than about 0.5 g/10 minute, and not more than about 100 g/10 minute, or not more than about 60 g/10 minute. The use of such unmodified ethylene-α-olefin copolymer (B) enables more enhancement of stability while a resin composition produced therefrom is extruded and tear strength of a multilayer article produced therefrom. Here, the "umnodified ethylene-α-olefin copolymer" means an ethylene-α-olefin copolymer not subjected to acid modification and means, for example, an ethylene-α-olefin copolymer that is not the acid-modified ethylene-α-olefin copolymer (C) described below. The unmodified ethylene-α-olefin copolymer (B) used for the present invention desirably has an acid value less than about 0.5 mg KOH/g.

Acid-Modified Ethylene-α-Olefin Copolymer (C)

The acid-modified ethylene-α-olefin copolymer (C) used for the present invention is obtained by copolymerization in which part of monomers constituting an ethylene-α-olefin copolymer is substituted by α,β-unsaturated carboxylic acid or anhydride monomers thereof or by introducing α,β-unsaturated carboxylic acid or an anhydride thereof to part of side chains by graft reaction, such as radical addition.

Examples of suitable α,β-unsaturated carboxylic acids or an anhydrides thereof used in the above acid modification include maleic acid, acrylic acid, itaconic acid, crotonic acid, maleic anhydride, and itaconic anhydride. Among all, maleic anhydride is preferred.

The acid modified ethylene-α-olefin copolymer (C) desirably has an acid value of about 50 mg KOH/g or less, or about 30 mg KOH/g, or about 20 mg KOH/g or less. If the acid value is higher than the range, reaction points with hydroxyl groups in the EVOH (A) are so increased that high polymers are formed in the course of melt kneading, leading to reduction in stability during extrusion and tendency not to easily produce a good multilayer article. In contrast, if the acid value is lower, compatibility with the EVOH (A) is reduced, leading to tendency to increase the amount of the resin adhered to the die (die build-up). The lower limit of the acid value is thus desirably about 1 mg KOH/g or more, or about 2 mg KOH/g or more.

The acid modified ethylene-α-olefin copolymer (C) desirably has a density of about 0.9 g/cm$^3$ or less, or about 0.89 g/cm$^3$ or less, or about 0.88 g/cm$^3$ or less. The use of such low-density acid-modified ethylene-α-olefin copolymer (C) enables production of a multilayer article and a multilayer structure particularly excellent in tear strength. In one embodiment, the acid modified ethylene-α-olefin copolymer (C) has a density of about 0.85 g/cm$^3$ or more. If acid modified ethylene-α-olefin copolymer (C) has density more than 0.9g/cm$^3$, the multilayer article may not show enough mechanical strength.

In the resin composition of the present invention, the acid-modified ethylene-α-olefin copolymer (C) is considered to have high compatibility with the EVOH (A) and also functions as a compatibilizer for the EVOH (A) and the unmodified ethylene-α-olefin copolymer (B). By reaction of the acid-modified ethylene-α-olefin copolymer (C) with the hydroxyl groups in the EVOH (A) while the resin composition is kneaded in a twin screw extruder for preparation, a graft polymer of the EVOH (A) and the acid-modified ethylene-α-olefin copolymer (C) is produced. Such graft polymer has compatibility with the EVOH (A) and further exhibits a compatibility effect with the EVOH (A) and the unmodified ethylene-α-olefin copolymer (B). This causes microdispersion of the unmodified ethylene-α-olefin copolymer (B) in the EVOH (A) to improve the stability of the resin composition during extrusion and also improve the tear strength of a multilayer article produced using the resin composition.

Mass Ratio of (A), (B), and (C)

In the resin composition of the present invention, a mass ratio [(A)/((B)+(C))] of an amount of the EVOH (A) to a total amount of the unmodified ethylene-α-olefin copolymer (B) and the acid modified ethylene-α-olefin copolymer (C) is, from the perspective of both bubble stability during extrusion and mechanical resistance during filling, storing and unloading of the grain, is generally from about 95/5 to about 75/25. If the mass ratio [(A)/((B)+(C))] is more than 95/5 or the unmodified ethylene-α-olefin copolymer (B) and the acid modified ethylene-α-olefin copolymer (C) are not contained, bubble stability and tear strength of a multilayer article produced therefrom are insufficient. The mass ratio is preferably about 92/8 or less, or about 90/10 or less. In contrast, if the mass ratio [(A)/((B)+(C))] is less than about 75/25, bubble stability of a multilayer article becomes worse. The mass ratio is preferably about 77/23 or more, or about 80/20 or more.

Mass Ratio of (B) and (C)

A mass ratio [(B)/(C)] of the unmodified ethylene-α-olefin copolymer (B) and the acid modified ethylene-α-olefin copolymer (C) is from 65/35 to about 5/95. The mass ratio being from 65/35 to about 5/95 causes the compatibility effect to be sufficient and the dispersibility of the unmodified ethylene-α-olefin copolymer (B) in the EVOH (A) to be good. If the mass ratio is more than 65/35 or the acid modified ethylene-α-olefin copolymer (C) is not contained, there may be (or are) insufficient graft polymers produced by the reaction of the EVOH (A) with the acid-modified ethylene-α-olefin copolymer (C) in the resin composition, resulting in poor compatibility between the EVOH (A) and the unmodified ethylene-α-olefin copolymer (B). As a result, bubble stability becomes worse. The mass ratio is preferably about 60/40 or less, or about 50/50 or less. In contrast, if the mass ratio is less than about 5/95, graft polymers produced by the reaction of the EVOH (A) with the acid-modified ethylene-α-olefin copolymer (C) in the resin composition increase and entanglement of the molecular chains increases, resulting in poor stability during extrusion and not easily producing a good multilayer article. In a multilayer article, specifically a multilayer film, produced using the resin composition of the present invention, from the perspective of further suppressing streaks caused on the film surface, the mass ratio is preferably about 10/90 or more, or about 25/75 or more.

MFR of Resin Composition

The resin composition of the present invention has an MFR at 210° C. under a load of 2160 g of not less than about 0.1 g/10 minute and not more than about 60 g/10 minute. Due to the MFR of the resin composition being within the range, the resin composition is excellent in stability during extrusion, and a good multilayer article thereof can be obtained. The lower limit of the MFR is preferably about 0.5 g/10 minute or more, or about 1.0 g/10 minute or more. Meanwhile, the upper limit of the MFR is preferably about 30 g/10 minute or less, or about 15 g/10 minute or less. Appropriate adjustment of the type and the mass ratio of each component to be used enables the MFR of the resin composition to be in the above range.

Other Components

The resin composition may contain other optional components within a range not to impair the effects of the present invention. Examples of such other components include, for example, a boron compound, an alkali metal salt, a phosphoric acid compound, an oxidizable substance, another polymer, an oxidization accelerator, and another additive.

Addition of a boron compound to the resin composition may be advantageous in terms of improving melt viscosity of the EVOH (A) and obtaining a homogenous coextrusion molded product or a coinjection molded product. Examples of suitable boron compounds include boric acids, a boric acid ester, a boric acid salt, and boron hydrides. Specific examples of the boric acids include orthoboric acid (hereinafter, also merely referred to as "boric acid"), metaboric acid and tetraboric acid. Specific examples of the boric acid ester include triethyl borate and trimethyl borate. Specific examples of the boric acid salt include alkali metal salts and alkaline earth metal salts of the above various types of boric acids, and borax. Among these compounds, orthoboric acid is preferred.

When a boron compound is added, the content of the boron compound in the composition is typically from about 20 ppm, or from about 50 ppm, to about 2000 ppm, or to about 1500 ppm, in terms of the boron element equivalent. The content of the boron compound in this range can suppress torque variation during heat melting.

The resin composition may also contain an alkali metal salt in an amount of from about 5 ppm, or from about 20 ppm, or from about 30 ppm, to about 5000 ppm, or to about 1000 ppm, or to about 500 ppm, in terms of the alkali metal element equivalent. The resin composition containing an alkali metal salt in the above range can improve the interlayer adhesiveness and the compatibility. An alkali metal is exemplified by, for example, lithium, sodium, and potassium, and the alkali metal salt is exemplified by, for example, an aliphatic carboxylic acid salt, an aromatic carboxylic acid salt, a phosphoric acid salt, and a metal complex of the alkali metal. Examples of the alkali metal salt include sodium acetate, potassium acetate, sodium phosphate, lithium phosphate, sodium stearate, potassium stearate, and sodium salts of ethylene diamine tetraacetic acid. Especially, sodium acetate, potassium acetate, and sodium phosphate are preferred.

In one embodiment, the resin composition contains substantially no (or no) added alkali metal.

The resin composition may also contain a phosphoric acid compound in an amount of from about 1 ppm, or from about 5 ppm, or from about 10 ppm, to about 500 ppm, or to about 300 ppm, or to about 200 ppm, in terms of the phosphate radical equivalent. Blending the phosphoric acid compound in the above range can improve the thermal stability of the EVOH (A) and suppress, in particular, generation of gel-state granules and coloring during melt molding for a long period of time.

The type of the phosphoric acid compound added to the resin composition is not particularly limited, and there can be used, for example, various types of acids such as phosphoric acid and phosphorous acid, and salts thereof. The phosphoric acid salt may be any form of a primary phosphoric acid salt, a secondary phosphoric acid salt, and a tertiary phosphoric acid salt. Although the cation species of the phosphoric acid salt is not also particularly limited, an alkali metal or an alkaline earth metal is preferred as the cation species. Especially, the phosphorus compound is preferably added in the form of sodium dihydrogen phosphate, potassium dihydrogen phosphate, disodium hydrogen phosphate or dipotassium hydrogen phosphate.

The resin composition may also contain various types of other additives within a range not to impair the effects of the present invention. Examples of such other additives include an antioxidant, a plasticizer, a heat stabilizer (melt stabilizer), a photoinitiator, a deodorizer, an ultraviolet ray absorber, an antistatic agent, a lubricant, a colorant, a filler, a drying agent, a bulking agent, a pigment, a dye, a processing aid, a fire retardant, and an anti-fogging agent.

Such other additives may be blended as long as not inhibiting actions and effects of the present invention. The content of these additives in the resin composition is generally about 10 mass % or less, or about 5 mass % or less.

As long as not inhibiting the objects of the present invention, the resin composition of the present invention may be blended with a thermoplastic resin and a thermosetting resin other than the EVOH (A), the unmodified ethylene-α-olefin copolymer (B), and the acid modified ethylene-α-olefin copolymer (C). Examples of the thermoplastic resin include polyolefin other than the unmodified ethylene-α-olefin copolymer (B) and the acid modified ethylene-α-olefin copolymer (C), polyamide, polyvinyl chloride, polyvinylidene chloride, polyester, polystyrene, and the like. Examples of the thermosetting resin include epoxy resins, acrylic resins, urethane resins, polyester resins, a single material or a mixture of modified products of these resins, and the like. The content of the resin other than the EVOH (A), the unmodified ethylene-α-olefin copolymer (B), and the acid modified ethylene-α-olefin copolymer (C) in the resin composition of the present invention is generally about 5 mass % or less, or about 1 mass % or less.

Preparation of Resin Composition

A method of preparing the resin composition of the present invention is not particularly limited, and examples include the following methods (1) through (3).

(1) A method in which the EVOH (A) (or a resin containing EVOH as a main component, hereinafter the same), the unmodified ethylene-α-olefin copolymer (B), and the acid-modified ethylene-α-olefin copolymer (C) are dry blended and melt compounded.

(2) A method in which pellets obtained by melt compounding of the unmodified ethylene-α-olefin copolymer (B) and the acid-modified ethylene-α-olefin copolymer (C) dry blended with the EVOH (A) and then melt compounded.

(3) A method in which the umnodified ethylene-α-olefin copolymer (B) and the acid-modified ethylene-α-olefin copolymer (C) are compounded with part of the EVOH (A) at a high concentration to prepare a master batch, which is then dry blended with the remaining EVOH (A) to be formed.

Among them, (1) or (2) is more preferred because individual components are homogeneously blended.

Means for melt compounding for preparation of the resin composition of the present invention is not particularly limited, and examples include, for example, a ribbon blender, a high-speed mixer-co-kneader, a mixing roll, an extruder (single screw or twin screw extruder, etc.), an intensive mixer, and the like. Among them, a method using a single screw or twin screw extruder is preferred. A temperature of melt compounding is appropriately selected, depending on the type and the molecular weight of resin to be used, a blending ratio of the composition, the type of extruder, and the like, and it is generally within the range of from about 170 to about 350° C.

When melt compounding is conducted using an extruder, it is preferred to use an extruder with a high degree of kneading, to seal a hopper port with nitrogen, and to extrude at a low temperature. This enables homogenization of the dispersed state and prevention of gelation or generation and contamination of foreign materials.

Multilayer Article

A multilayer article produced using the resin composition of the present invention is excellent in oxygen barrier properties and tear strength. Accordingly, the multilayer article is useful as a storage bag for agricultural products, food, drink, pharmaceutical, cosmetic, industrial chemical, detergent products. And, the multilayer article is preferably used for storage bag for agricultural products.

Structure of Multilayer Article

The layer structure of the multilayer article of the present invention is not particularly limited, and where E represents a layer obtained from the resin composition of the present invention, Ad represents a layer obtained from an adhesive resin, and T represents a layer obtained from a polyolefin resin, the following layer structures are exemplarily mentioned.

Adhesive resins for adhering EVOH-containing layers to other layers are in general known to those of ordinary skill in the relevant art. Preferred resins for use as the adhesive resin include polyolefins modified with unsaturated carboxylic acid or a derivative thereof. Typical examples of suitable adhesive resins include carboxyl group-containing modified polyolefin resins obtained by chemically binding an unsaturated carboxylic acid or an anhydride thereof to a polyolefin resin. Specific examples of the adhesive resin include polyethylenes modified with maleic anhydride, polypropylenes modified with maleic anhydride, a maleic anhydride-modified ethylene-ethyl acrylate copolymer, and a maleic anhydride-graft-modified ethylene-vinyl acetate copolymer. In terms of mechanical strength and molding processability, polyethylenes modified with maleic anhydride and polypropylenes modified with maleic anhydride are preferable, and polyethylenes modified with maleic anhydride are particularly preferable among these.

Regarding the melt viscosity of the adhesive resin, the MFR at 190° C. and a 2160-g load typically has a lower limit of about 0.1 g/10 minutes, or about 0.2 g/10 minutes, and typically has an upper limit of about 100 g/10 minutes, or about 60 g/10 minutes. The difference between the MFR of the adhesive resin and the MFR of the EVOH resin composition is preferably small. When the melt viscosity of the adhesive resin is as described above, an excellent multilayer article having excellent adhesive strength without any layer turbulence can be obtained.

Polyolefin resins suitable for use in the present invention are also in general known to those of ordinary skill in the relevant art. Preferred polyolefin resins include, for example, linear low-density polyethylene, low-density polyethylene, medium-density polyethylene, high-density polyethylene, ethylene-vinyl acetate copolymers and polypropylene.

When the multilayer structure described below is used for a multilayer article, the leftmost layer is the innermost layer, and the rightmost layer is the outermost layer.

Five layers: T/Ad/E/Ad/T, Ad/E/Ad/E/Ad, T/Ad/E/Ad/E

Six layers: T/T/Ad/E/Ad/T, T/Ad/E/Ad/T/T, Ad/E/Ad/E/Ad/E, T/Ad/E/Ad/E/Ad

Seven layers: T/T/Ad/E/Ad/T/T, T/Ad/E/Ad/E/Ad/T

In the multilayer structure of the present invention, the polyolefin resin and/or the adhesive resin may be substituted by scrap of the multilayer structure. Moreover, scrap of another polyolefin multilayer article may be mixed and used.

For preventing moisture in order to avoid degrading oxygen barrier property, a structure, in which the EVOH resin composition layer represented as E is used as an intermediate (core) layer and the polyolefin layer as T is used as an outer layer, is preferable. If the EVOH resin composition layer is placed as outermost layer or innermost layer, the EVOH resin composition layer absorbs moisture from environment or contents and oxygen barrier property may get worse. And the structures of T/Ad/E/Ad/T and T/T/Ad/E/Ad/T/T are more preferable among these.

Regarding the thickness of the multilayer article in accordance with one embodiment of the present invention, the total thickness thereof is typically from about 100 µm, or from about 120 µm, or from about 150 µm, to about 400 µm, or to about 300 µm, or to about 250 µm. If thickness is less than 100 µm, barrier properties are not enough. If the thickness is greater than 500 µm, bubble stability gets worse and the multilayer article cannot be prepared.

The thickness of the (each) the "EVOH" resin composition layer in the film is not particularly limited, but is typically from about 2 µm, or from about 3 µm, or from about 4 µm, to about 25 µm, or to about 20 µm, or to about 15 µm.

The thickness of the (each) the adhesive resin composition layer in the film is not particularly limited, but is typically from about 2 µm, or from about 3 µm, or from about 4 µm, to about 12.5 µm, or to about 10 µm, or to about 7.5 µm.

The thickness of the (each) polyolefin composition layer in the film is not particularly limited, but is typically from about 25 µm, or from about 30 µm, or from about 35 µm, to about 200 µm, or to about 180 µm, or to about 150 µm.

The thickness ratio of the EVOH resin composition layer in the total layer thickness is preferably from about 1% to about 15%.

A method of producing the multilayer structure of the present invention is not particularly limited. Examples include a method in which a thermoplastic resin is melt extruded on a multilayer article (film, sheet, and the like)

obtained from the resin composition of the present invention, a method in which the resin composition and another thermoplastic resin are coextruded, a method in which a multilayer article formed from the resin composition and a film or a sheet of another substrate are laminated using a known adhesive, such as an organic titanium compound, an isocyanate compound, and a polyester-based compound, and the like.

Examples of the forming machine to produce the multilayer article include, for example, a cast co-extrusion machine, a blown co-extrusion machine, a blow molding machine, a extrusion coating machine, and the like. Especially, in order to get advantage of this invention, the multilayer article is preferably prepared using a blown co-extrusion machine. Specific examples of the multilayer article include a film, a sheet and the like. The extrusion temperature for forming is appropriately selected depending on the type of resin to be used, a molecular weight, a blending ratio of the composition, the type of forming machine, and the like, and is generally within the range of from about 170° C. to about 350° C.

EXAMPLES

The present invention is more specifically described by way of examples. The scope of the present invention, however, is not limited to these examples. It is to be noted that production methods as well as methods of measurement, calculation and evaluation in Examples and Comparative Examples are each as described below.

Ethylene Unit Content in and Saponification Degree of EVOH (A)

Measurement was conducted by $^1$H-NMR measurement (JNM-GX-500, JEOL Ltd., Tokyo Japan) using DMSO-$d_6$ as a solvent.

Melt Flow Rate (MFR)

The discharging rate (g/10 minutes) of a sample was measured by a melt flow indexer (MP1200, Tinius Olsen TMC, Horsham, Pa. USA) under conditions of a temperature at 190° C. or 210° C., and with a load of 2160 g.

MATERIALS

EVOH A-1: EVAL™ F104B, Ethylene-Vinyl Alcohol copolymer commercially available from Kuraray Co., Ltd. (ethylene content 32 mol %, a degree of saponification 99.9 mol %, MFR of 4.4 g/10 minutes (190° C., 2160 g)).

EVOH A-2: EVAL™ L104B, Ethylene-Vinyl Alcohol copolymer commercially available from Kuraray Co., Ltd. (ethylene content 27 mol %, degree of saponification 99.9 mol %, MFR of 8.0 g/10 minutes (210° C., 2160 g)).

EO-1: Tafmer™ P0280, Ethylene-Propylene copolymer commercially available from Mitsui Chemicals, Inc.

EO-2: Tafmer™ A4050S, Ethylene-Butene copolymer commercially available from Mitsui Chemicals, Inc.

AEO-1: Tafmer™ MP0610, Maleic anhydride modified Ethylene-Propylene copolymer commercially available from Mitsui Chemicals, Inc.

AEO-2: Tafmer™ MH7010, Maleic anhydride modified Ethylene-Butene copolymer commercially available from Mitsui Chemicals, Inc.

Example 1

80 parts by mass of EVOH-1, 10 parts by mass of EO-1 and 10 parts by mass of AEO-1 were blended. The resulting blend was subjected to melt compounding, pelletizing and drying under the following conditions, and then the resin composition was obtained.

Apparatus: 30 mm D twin screw extruder (TEX-30α manufactured by The Japan Steel Works, Ltd.)
L/D: 45 Screw: co-rotating full-intermeshing type
Number of die holes: 4 holes (3 mm D)
Extrusion temperature (° C.): C2=180, C3=200, C4-C13=230, Die=230
Rotation speed: 200 rpm
Output: about 20 kg/hr
Drying: hot air drying at 80° C. for 6 hr Conditions for Preparing Co-Extruded EVOH Film The resulting resin composition was formed into a multilayer film under the following conditions.

Lay flat width of obtained film was 735 mm. Total film thickness was adjusted to 150 μm. Thickness percentage of the resin composition layer was adjusted to 4%.

Layer Structure 4-material-7-layer (outer layer A/outer layer B/adhesive resin layer C/EVOH resin composition layer D/adhesive resin layer E/outer layer F/outer layer G)

Outer layers A, B: Blend of LLDPE/mLLDPE/White MB=58/32/10 wt % wherein LLDPE is SCLAIR™ FP120-A produced by NOVA Chemicals, mLLDPE is ELITE™ 5401G produced by Dow Chemical Company, White MB is Ampacet 112122 produced by Ampacet Corporation.

Outer layers F, G: Blend of LLDPE/mLLDPE/Black MB=74/20/6 wt % wherein LLDPE is SCLAIR™ FP120-A produced by NOVA Chemicals, mLLDPE is ELITE™ 5401G produced by Dow Chemical Company, Black MB is Ampacet 190580 produced by Ampacet Corporation, Adhesive resin layers C, E: Admer™ NF498A produced by Mitsui Chemicals, Inc.

Apparatus: a 7-material-7-layer blown film extruder (manufactured by Brampton Engineering)
Outer layer A: 45-mmφ single screw extruder (L/D=24),
Outer layer B: 30-mmφ single screw extruder (L/D=24),
Outer layer F: 30-mmφ single screw extruder (L/D=24),
Outer layer G: 45-mmφ single screw extruder (L/D=24),
Adhesive resin layer C: 30-mmφ single screw extruder (L/D=24), Adhesive resin layer E: 30-mmφ single screw extruder (L/D=24), Resin composition layer: 30-mmφ single screw extruder (L/D=20)
Temperature setting (° C.):
Outer layers A, B, F and G: C1/C2/C3/A=180/190/205/205
Adhesive resin layers C and E: C1/C2/C3/A=190/225/215/220
Resin composition layer D: C1/C2/C3/A=180/210/215/220
Die: 150 mm, temperature set at 220° C.
Blow up ratio: 3.09 (lay-flat width 735 mm)

Measuring of Thickness of the Multilayer Film

The thickness of each layer in the multilayer film was measured by following procedure and summarized in Table 2.

Samples were collected from center of width at the beginning of film preparation. Collected samples were cut by knife and sliced by microtome. The thickness of each layer was measured from the cross section observation by microscope (manufactured by Nikon). The thickness of layer A and B, and layer F and G, could not be individually determined because the boundary was unclear.

Bubble Stability

Bubble stability during film making was evaluated by the criteria below. The result is shown in Table 2.
- A: Stable
- B: Some upset
- C: Severe upset
- D: Impossible to make film Oxygen Transmission Rate The obtained multilayer film was conditioned at 20° C./65% RH. In accordance with ISO14663-2, oxygen permeability of the film was measured by using an oxygen permeability measuring device (OX-Tran 2/20 produced by Modern Control) at 20° C./65% RH. The result is shown in Table 2.

Tear Strength

The obtained multilayer film was conditioned at 23° C./50% RH. In accordance with ASTM D 1922-15, tear strength of the film for MD direction was measured by using an Elmendorf tearing tester (Electronic Elmendorf Pro Tear produced by Thwing-Albert Instrument Company). The result is shown in Table 2.

Filling Test

Filling test of grain for the obtained multilayer film was done by using an grain bagger (E2950 produced by AKRON). The start end of the film was closed by heat seal. The result of filling test was evaluated by the criteria below and shown in Table 2.
- A: No problem to fill the grain
- B: Failure sometimes occurred from a scratch of film
- C: Impossible to fill because of tearing of film Example 2

Example 1 was repeated, except that EVOH percentage was adjusted to 6% of total film thickness as shown in Tables 1 and 2.

The test results are shown in Table 2.

Example 3

Example 1 was repeated, except that EVOH percentage was adjusted to 8% of total film thickness as shown in Tables 1 and 2.

The test results are shown in Table 2.

Example 4

Example 1 was repeated, except that total thickness of multilayer film was adjusted to 250 micron as shown in Tables 1 and 2.

Bubble stability, OTR and tear strength were evaluated. The test results are shown in Table 2.

Example 5

Example 1 was repeated, except that total thickness of multilayer film was adjusted to 250 micron and EVOH percentage was adjusted to 6% of total film thickness as shown in Tables 1 and 2.

Bubble stability, OTR and tear strength were evaluated. The test results are shown in Table 2.

Example 6

Example 1 was repeated, except that total thickness of multilayer film was adjusted to 250 micron and EVOH percentage was adjusted to 8% of total film thickness as shown in Tables 1 and 2.

Bubble stability, OTR and tear strength were evaluated. The test results are shown in Table 2.

Example 7

Example 1 was repeated, except that total thickness of multilayer film was adjusted to 120 micron and EVOH percentage was adjusted to 6% of total film thickness as shown in Tables 1 and 2.

Bubble stability, OTR and tear strength were evaluated. The test results are shown in Table 2.

Example 8

Example 1 was repeated, except that total thickness of multilayer film was adjusted to 300 micron and EVOH percentage was adjusted to 6% of total film thickness as shown in Tables 1 and 2.

Bubble stability, OTR and tear strength were evaluated. The test results are shown in Table 2.

Example 9

Example 1 was repeated, except that total thickness of multilayer film was adjusted to 400 micron and EVOH percentage was adjusted to 6% of total film thickness as shown in Tables 1 and 2.

Bubble stability, OTR and tear strength were evaluated. The test results are shown in Table 2.

Comparative Example 1

Example 1 was repeated, except that total thickness of multilayer film was adjusted to 90 micron as shown in Tables 1 and 2.

The test results are shown in Table 2.

Comparative Example 2

Example 1 was repeated, except that total thickness of multilayer film was adjusted to 90 micron and EVOH percentage was adjusted to 6% of total film thickness as shown in Tables 1 and 2.

Bubble stability, OTR and tear strength were evaluated. The test results are shown in Table 2.

Comparative Example 3

Example 1 was repeated, except that total thickness of multilayer film was adjusted to 90 micron and EVOH percentage was adjusted to 8% of total film thickness as shown in Tables 1 and 2.

Bubble stability, OTR and tear strength were evaluated. The test results are shown in Table 2.

Comparative Example 4

Example 1 was repeated, except that an attempt was made to adjust the total thickness of the multilayer film to 500 micron as shown in Tables 1 and 2.

The film, however, could not be prepared because bubble was not stable.

Comparative Example 5

Example 1 was repeated, except that an attempt was made to adjust the total thickness of multilayer film to 500 micron and the EVOH percentage to 6% of total film thickness as shown in Tables 1 and 2.

The film, however, could not be prepared because bubble was not stable.

Comparative Example 6

Example 1 was repeated, except that an attempt was made to adjust the total thickness of multilayer film to 500 micron and EVOH percentage to 8% of total film thickness as shown in Tables 1 and 2.

The film, however, could not be prepared because bubble was not stable.

Example 10

Example 1 was repeated, except that EVOH-2 was used in place of EVOH-1 as shown in Tables 1 and 3.

Bubble stability, OTR and tear strength were evaluated. The test results are shown in Table 3.

Example 11

Example 1 was repeated, except that EO-2 was used in place of EO-1 and AEO-2 was used in place of AEO-1 as shown in Tables 1 and 3.

Bubble stability, OTR and tear strength were evaluated. The test results are shown in Table 3.

Example 12

Example 1 was repeated, except that 5 parts by mass of EO-1 and 15 parts by mass of AEO-1 were used as shown in Tables 1 and 3.

Bubble stability, OTR and tear strength were evaluated. The test results are shown in Table 3.

Example 13

Example 1 was repeated, except that 2 parts by mass of EO-1 and 18 parts by mass of AEO-1 were used as shown in Tables 1 and 3.

Bubble stability, OTR and tear strength were evaluated. The test results are shown in Table 3.

Example 14

Example 1 was repeated, except that 95 parts by mass of EVOH-1, 2.5 parts by mass of EO-1 and 2.5 parts by mass of AEO-1 were used as shown in Tables 1 and 3.

Bubble stability, OTR and tear strength were evaluated. The test results are shown in Table 3.

Example 15

Example 1 was repeated, except that 90 parts by mass of EVOH-1, 5 parts by mass of EO-1 and 5 parts by mass of AEO-1 were used as shown in Tables 1 and 3.

Bubble stability, OTR and Tear strength were evaluated. The test results are shown in Table 3.

Example 16

Example 1 was repeated, except that 75 parts by mass of EVOH-1, 12.5 parts by mass of EO-1 and 12.5 parts by mass of AEO-1 were used as shown in Tables 1 and 3.

Bubble stability, OTR and tear strength were evaluated. The test results are shown in Table 3.

Comparative Example 7

Example 1 was repeated, except that 100 parts by mass of EVOH-1 were used without melt compounding as shown in Tables 1 and 3.

The test results are shown in Table 3.

Comparative Example 8

Example 1 was repeated, except that 80 parts by mass of EVOH-1, 20 parts by mass of EO-1 and 0 parts by mass of AEO-1 were used as shown in Tables 1 and 3.

The film, however, could not be prepared because bubble was not stable.

Comparative Example 9

Example 1 was repeated, except that 0 parts by mass of EO-1 and 20 parts by mass of AEO-1 were used as shown in Tables 1 and 3.

Bubble stability, OTR and tear strength were evaluated. The test results are shown in Table 3.

Comparative Example 10

Example 1 was repeated, except that 70 parts by mass of EVOH-1, 15 parts by mass of EO-1 and 15 parts by mass of AEO-1 were used as shown in Tables 1 and 3.

Bubble stability, OTR and Tear strength were evaluated. The test results are shown in Table 3.

Comparative Example 11

Example 1 was repeated, except that 70 parts by mass of EVOH-1, 27 parts by mass of EO-1 and 3 parts by mass of AEO-1 were used as shown in Tables 1 and 3.

Bubble stability, OTR and Tear strength were evaluated. The test results are shown in Table 3.

TABLE 1

| | EVOH Blend | EVOH Grade | EVOH Parts by Mass | Ethylene-α-Olefin Copolymer Grade | Ethylene-α-Olefin Copolymer Parts by Mass | Acid Modified Ethylene-α-Olefin Copolymer Grade | Acid Modified Ethylene-α-Olefin Copolymer Parts by Mass |
|---|---|---|---|---|---|---|---|
| Ex 1 | B-1 | EVOH-1 | 80 | EO-1 | 10 | AEO-1 | 10 |
| Ex 2 | B-1 | EVOH-1 | 80 | EO-1 | 10 | AEO-1 | 10 |
| Ex 3 | B-1 | EVOH-1 | 80 | EO-1 | 10 | AEO-1 | 10 |
| Ex 4 | B-1 | EVOH-1 | 80 | EO-1 | 10 | AEO-1 | 10 |
| Ex 5 | B-1 | EVOH-1 | 80 | EO-1 | 10 | AEO-1 | 10 |
| Ex 6 | B-1 | EVOH-1 | 80 | EO-1 | 10 | AEO-1 | 10 |
| Ex 7 | B-1 | EVOH-1 | 80 | EO-1 | 10 | AEO-1 | 10 |
| Ex 8 | B-1 | EVOH-1 | 80 | EO-1 | 10 | AEO-1 | 10 |
| Ex 9 | B-1 | EVOH-1 | 80 | EO-1 | 10 | AEO-1 | 10 |

TABLE 1-continued

|  |  | EVOH |  | Ethylene-α-Olefin Copolymer |  | Acid Modified Ethylene-α-Olefin Copolymer |  |
|---|---|---|---|---|---|---|---|
|  | EVOH Blend | Grade | Parts by Mass | Grade | Parts by Mass | Grade | Parts by Mass |
| CEx 1 | B-1 | EVOH-1 | 80 | EO-1 | 10 | AEO-1 | 10 |
| CEx 2 | B-1 | EVOH-1 | 80 | EO-1 | 10 | AEO-1 | 10 |
| CEx 3 | B-1 | EVOH-1 | 80 | EO-1 | 10 | AEO-1 | 10 |
| CEx 4 | B-1 | EVOH-1 | 80 | EO-1 | 10 | AEO-1 | 10 |
| CEx 5 | B-1 | EVOH-1 | 80 | EO-1 | 10 | AEO-1 | 10 |
| CEx 6 | B-1 | EVOH-1 | 80 | EO-1 | 10 | AEO-1 | 10 |
| Ex 10 | B-2 | EVOH-2 | 80 | EO-1 | 10 | AEO-1 | 10 |
| Ex 11 | B-3 | EVOH-1 | 80 | EO-2 | 10 | AEO-2 | 10 |
| Ex 12 | B-6 | EVOH-1 | 80 | EO-1 | 5 | AEO-1 | 15 |
| Ex 13 | B-7 | EVOH-1 | 80 | EO-1 | 2 | AEO-1 | 18 |
| Ex 14 | B-8 | EVOH-1 | 95 | EO-1 | 2.5 | EO-1 | 2.5 |
| Ex 15 | B-9 | EVOH-1 | 90 | EO-1 | 5.0 | EO-1 | 5.0 |
| Ex 16 | B-10 | EVOH-1 | 75 | EO-1 | 12.5 | AEO-1 | 12.5 |
| CEx 7 | — | EVOH-1 | 100 | — | — | — | — |
| CEx 8 | B-11 | EVOH-1 | 80 | EO-1 | 20 | AEO-1 | 0 |
| CEx 9 | B-12 | EVOH-1 | 80 | EO-1 | 0 | AEO-1 | 20 |
| CEx 10 | B-13 | EVOH-1 | 70 | EO-1 | 15 | AEO-1 | 15 |
| CEx 11 | B-14 | EVOH-1 | 70 | EO-1 | 27 | AEO-1 | 3 |

TABLE 2

|  | Structure | Total Thickness (um) | EVOH % | EVOH Thickness (um) | Bubble Stability A > B > C > D | OTR 20° C./65% RH cc/m2 · day · atm | Tear Strength (gf) | Filling Test A > B > C |
|---|---|---|---|---|---|---|---|---|
| Ex 1 | PE/tie/EVOH/tie/PE | 150 | 4 | 6 | A | 1.7 | >1600 | A |
| Ex 2 | PE/tie/EVOH/tie/PE | 150 | 6 | 9 | A | 1.1 | >1600 | A |
| Ex 3 | PE/tie/EVOH/tie/PE | 150 | 8 | 12 | A | 0.8 | 750 | B |
| Ex 4 | PE/tie/EVOH/tie/PE | 250 | 4 | 10 | A | 1.0 | >1600 | — |
| Ex 5 | PE/tie/EVOH/tie/PE | 250 | 6 | 15 | A | 0.7 | >1600 | — |
| Ex 6 | PE/tie/EVOH/tie/PE | 250 | 8 | 20 | B | 0.5 | 1250 | — |
| Ex 7 | PE/tie/EVOH/tie/PE | 120 | 6 | 7 | A | 1.4 | 1300 | — |
| Ex 8 | PE/tie/EVOH/tie/PE | 300 | 6 | 18 | A | 0.6 | >1600 | — |
| Ex 9 | PE/tie/EVOH/tie/PE | 400 | 6 | 24 | B | 0.4 | >1600 | — |
| CEx 1 | PE/tie/EVOH/tie/PE | 90 | 4 | 4 | A | 2.8 | 500 | C |
| CEx 2 | PE/tie/EVOH/tie/PE | 90 | 6 | 5 | A | 1.9 | 450 | — |
| CEx 3 | PE/tie/EVOH/tie/PE | 90 | 8 | 7 | A | 1.4 | 400 | — |
| CEx 4 | PE/tie/EVOH/tie/PE | 500 | 4 | 20 | D | — | — | — |
| CEx 5 | PE/tie/EVOH/tie/PE | 500 | 6 | 30 | D | — | — | — |
| CEx 6 | PE/tie/EVOH/tie/PE | 500 | 8 | 40 | D | — | — | — |

TABLE 3

|  | Structure | Total Thickness (um) | EVOH % | EVOH Thickness (um) | Bubble Stability A > B > C > D | OTR 20° C./65% RH cc/m2 · day · atm | Tear Strength (gf) | Filling Test A > B > C |
|---|---|---|---|---|---|---|---|---|
| Ex 10 | PE/tie/EVOH/tie/PE | 150 | 6 | 9 | A | 0.7 | >1600 | — |
| Ex 11 | PE/tie/EVOH/tie/PE | 150 | 6 | 9 | A | 1.1 | >1600 | — |
| Ex 12 | PE/tie/EVOH/tie/PE | 150 | 6 | 9 | A | 1.1 | >1600 | — |
| Ex 13 | PE/tie/EVOH/tie/PE | 150 | 6 | 9 | B | 1.1 | >1600 | — |
| Ex 14 | PE/tie/EVOH/tie/PE | 150 | 6 | 9 | B | 0.8 | 1000 | — |
| Ex 15 | PE/tie/EVOH/tie/PE | 150 | 6 | 9 | A | 0.9 | 1100 | — |
| Ex 16 | PE/tie/EVOH/tie/PE | 150 | 6 | 9 | B | 1.3 | 1300 | — |
| CEx 7 | PE/tie/EVOH/tie/PE | 150 | 6 | 9 | C | 0.7 | 950 | C |
| CEx 8 | PE/tie/EVOH/tie/PE | 150 | 6 | 9 | D | — | — | — |
| CEx 9 | PE/tie/EVOH/tie/PE | 150 | 6 | 9 | C | 1.1 | 1100 | — |
| CEx 10 | PE/tie/EVOH/tie/PE | 150 | 6 | 9 | C | 1.6 | 1200 | — |
| CEx 11 | PE/tie/EVOH/tie/PE | 150 | 6 | 9 | C | 1.6 | 1100 | — |

As shown in Table 2, Examples 1 to 9 showed good bubble stability during film making process. The multilayer films from these resin compositions showed excellent oxygen transmission rate and tear strength. Examples 1 to 3 passed the filling test which indicates that tear strength was good enough for practical use.

On the other hand, Comparative Examples 1 to 3 (which did not have enough total thickness for the multilayer film) showed weak tear strength. Comparative Example 1 did not pass the filling test because of failure caused by weak tear strength.

Regarding Comparative Examples 4 to 6 (which tried to have thick total thickness), the multilayer films could not be prepared because bubble stability was too bad.

As shown in Table 3, Examples 10 to 16 showed good bubble stability during the film making process. The multilayer films from these resin compositions also showed excellent oxygen transmission rate and tear strength.

Comparative Example 7, which did not have the ethylene-α-olefin copolymer and the acid modified ethylene-α-olefin copolymer in the resin composition, showed bad bubble stability. The multilayer film from this resin composition did not pass the filling test because of uneven thickness caused by bad bubble stability.

Regarding Comparative Example 8, which did not have the acid modified ethylene-α-olefin copolymer in the resin composition, the multilayer films could not be prepared because bubble stability was too bad.

Regarding Comparative Example 9, which did not have the unmodified ethylene-α-olefin copolymer in the resin composition, the multilayer films showed bad bubble stability.

Comparative Examples 10 and 11, which had higher ethylene-α-olefin copolymer and acid modified ethylene-α-olefin copolymer contents than inventive Examples, showed bad bubble stability.

The invention claimed is:

1. A multilayer article comprising at least one layer formed from an EVOH resin composition consisting of:
   an ethylene-vinyl alcohol copolymer (A), having a degree of saponification of 99 mol % or greater and an ethylene content of about 18 mol % or greater and about 55 mol % or less;
   an unmodified ethylene-α-olefin copolymer (B);
   an acid-modified ethylene-α-olefin copolymer(C); and
   optionally an additive selected from the group consisting of a boron compound, an alkali metal salt and a phosphoric acid compound;
   wherein
   a mass ratio [(A)/((B)+(C))] of the ethylene-vinyl alcohol copolymer (A) to a total amount of the unmodified ethylene-α-olefin copolymer (B) and the acid modified ethylene-α-olefin copolymer (C) is from about 95/5 to about 75/25,
   a mass ratio [(B)/(C)] of the unmodified ethylene-α-olefin copolymer (B) to the acid modified ethylene-α-olefin copolymer (C) is from 65/35 to about 5/95, and
   a total thickness of the multilayer article is 100 μm or greater and less than 500 μm.

2. The multilayer article of claim 1, wherein the multilayer article is a multilayer film.

3. The multilayer article of claim 1, comprising:
   (i) a core layer (E),
   (ii) an outer layer (T) obtained from a polyolefin resin, and
   (iii) an adhesive layer (Ad) between the core layer and the outer layer,
   wherein the core layer (E) is of the EVOH resin composition.

4. The multilayer article of claim 3, comprising two outer layers, and an adhesive layer between each outer layer and the core layer.

5. The multilayer article of claim 4, wherein the total thickness of the multilayer article is from 100 μm to about 400 μm, the thickness of each outer layer T is from about 25 μm to about 200 μm, and the thickness ratio of the core layer E to the total thickness is from about 1% to about 15%.

6. The multilayer article of claim 4, wherein the multilayer article is a multilayer film.

7. The multilayer article according to claim 3, having a structure T/Ad/E/Ad/T or T/T/Ad/E/Ad/T/T.

8. The multilayer article of claim 3, wherein the total thickness of the multilayer article is from 100 μm to about 400 μm, the thickness of each outer layer T is from about 25 μm to about 200 μm, and the thickness ratio of the core layer E to the total thickness is from about 1% to about 15%.

9. The multilayer article of claim 7, wherein the total thickness of the multilayer article is from 100 μm to about 400 μm, the thickness of each outer layer T is from about 25 μm to about 200 μm, and the thickness ratio of the core layer E to the total thickness is from about 1% to about 15%.

10. The multilayer article of claim 7, wherein the multilayer article is a multilayer film.

11. The multilayer article of claim 3, wherein the multilayer article is a multilayer film.

12. A storage bag for agricultural products comprising at least one layer of the EVOH resin composition of claim 1.

13. The storage bag of claim 12, comprising:
    (i) a core layer (E) of the EVOH resin composition,
    (ii) an outer layer (T) obtained from a polyolefin resin, and
    (iii) an adhesive layer (Ad) between the core layer and the outer layer.

14. The storage bag of claim 13, comprising two outer layers, and an adhesive layer between each outer layer and a core layer.

15. The storage bag of claim 13, having a structure T/Ad/E/Ad/T or T/T/Ad/E/Ad/T/T.

16. A method of storing a bulk amount of grain comprising: filling a storage bag with said bulk amount of grain then sealing the so filled storage bag, wherein the storage bag is as set forth in claim 12.

* * * * *